United States Patent
Ishii et al.

(10) Patent No.: US 7,933,742 B2
(45) Date of Patent: Apr. 26, 2011

(54) ABNORMALITY DIAGNOSING METHOD FOR SOUND OR VIBRATION AND ABNORMALITY DIAGNOSING APPARATUS FOR SOUND OR VIBRATION

(75) Inventors: Hideaki Ishii, Sakai (JP); Hiroshi Uemura, Kaizuka (JP); Zhong Zhang, Toyohashi (JP)

(73) Assignees: JTEKT Corporation, Osaka (JP); Zhong Zhang, Toyohashi-Shi (JP)

( * ) Notice: Subject to any disclaimer, the term of this patent is extended or adjusted under 35 U.S.C. 154(b) by 675 days.

(21) Appl. No.: 11/700,188

(22) Filed: Jan. 31, 2007

(65) Prior Publication Data

US 2007/0176759 A1 Aug. 2, 2007

(30) Foreign Application Priority Data

Feb. 1, 2006 (JP) ................. 2006-025154

(51) Int. Cl.
*G06F 11/30* (2006.01)

(52) U.S. Cl. .............. 702/183; 702/33; 702/56; 702/66; 702/185; 702/190; 381/86; 340/438

(58) Field of Classification Search .................. 702/183, 702/33, 56, 66, 182, 185, 189–195; 382/278; 73/593, 602, 659, 660; 381/71.1, 71.8

See application file for complete search history.

(56) References Cited

U.S. PATENT DOCUMENTS

| | | | | |
|---|---|---|---|---|
| 6,199,019 B1 * | 3/2001 | Iino et al. | ......................... | 702/35 |
| 6,901,353 B1 * | 5/2005 | Huang | ......................... | 702/189 |
| 2004/0138831 A1 * | 7/2004 | Watanabe et al. | ................ | 702/33 |
| 2006/0167659 A1 * | 7/2006 | Miyasaka et al. | ............. | 702/185 |
| 2006/0256342 A1 * | 11/2006 | Wong et al. | .................... | 356/450 |
| 2007/0118333 A1 * | 5/2007 | Miyasaka et al. | ............. | 702/183 |
| 2008/0033695 A1 * | 2/2008 | Sahara et al. | ................ | 702/185 |
| 2008/0234964 A1 * | 9/2008 | Miyasaka et al. | ............. | 702/113 |

FOREIGN PATENT DOCUMENTS

| | | | |
|---|---|---|---|
| JP | 5-26722 | A | 2/1993 |
| JP | 7-243906 | A | 9/1995 |
| JP | 9-90977 | A | 4/1997 |
| JP | 10-267743 | A | 10/1998 |
| JP | 11-94642 | A | 4/1999 |
| JP | 2000-275098 | A | 10/2000 |
| JP | 3561151 | B2 | 6/2004 |

OTHER PUBLICATIONS

Zhong Zhang et al., Transactions of Society of Automotive Engineers of Japan, vol. 33, No. 3, Jul. 2002, pp. 37-42.

* cited by examiner

*Primary Examiner* — Mohamed Charioui
*Assistant Examiner* — Ricky Ngon
(74) *Attorney, Agent, or Firm* — Birch, Stewart, Kolasch & Birch, LLP

(57) ABSTRACT

A noise detection signal detected at an evaluation point is filtered by a low pass filter, so that an evaluation waveform signal is extracted. A real signal mother wavelet of complex type is derived from the extracted evaluation waveform signal. Using this mother wavelet, an abnormal waveform signal stored in advance is processed by wavelet transformation. Then, a correlation value is calculated between the abnormal waveform signal and the mother wavelet. The correlation value is compared with a predetermined criterion, so that the presence or absence of abnormality in a sound source or vibration source corresponding to each abnormal waveform signal is determined.

3 Claims, 6 Drawing Sheets

F I G. 4 A
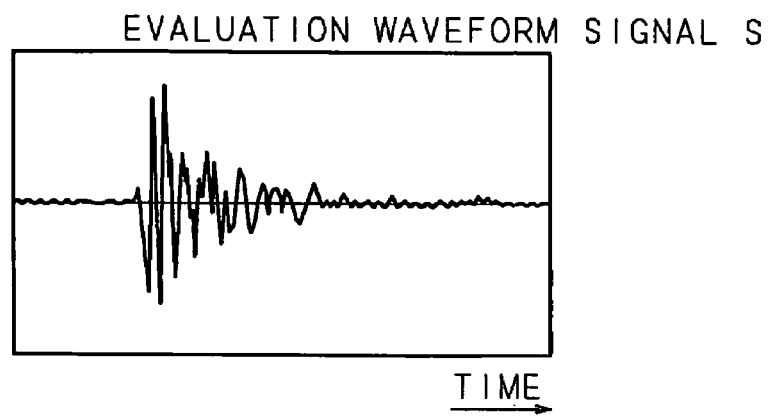
EVALUATION WAVEFORM SIGNAL S
F I G. 4 B
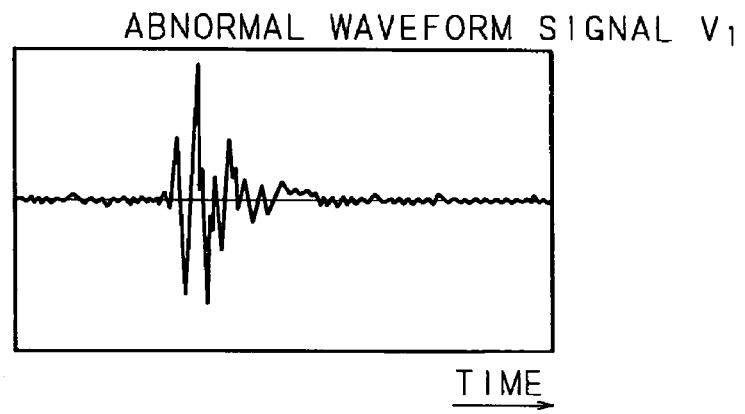
ABNORMAL WAVEFORM SIGNAL $V_1$
F I G. 4 C
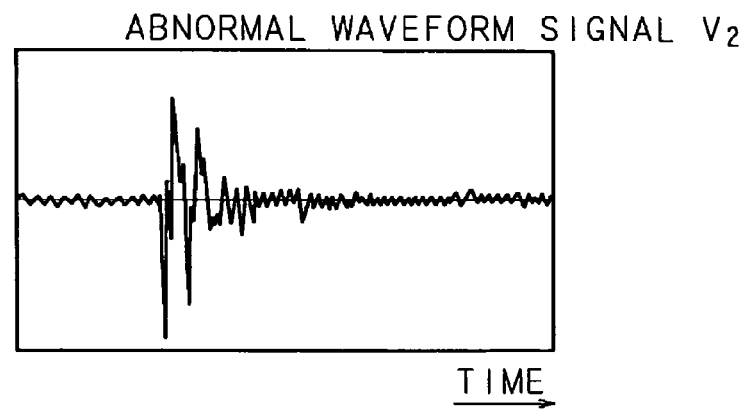
ABNORMAL WAVEFORM SIGNAL $V_2$
F I G. 4 D
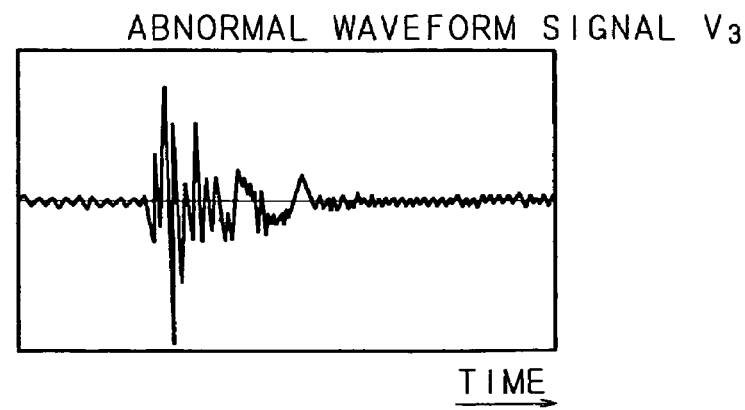
ABNORMAL WAVEFORM SIGNAL $V_3$

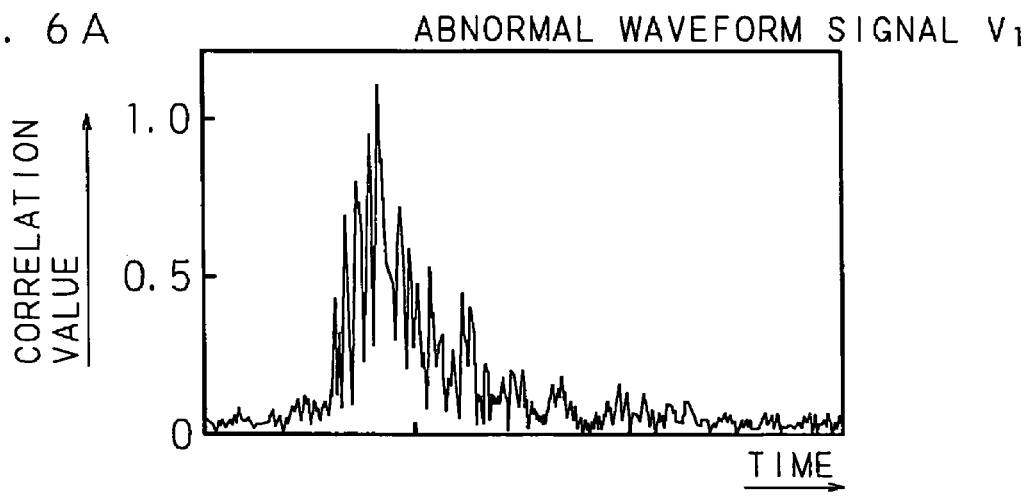
FIG. 6A  ABNORMAL WAVEFORM SIGNAL $V_1$
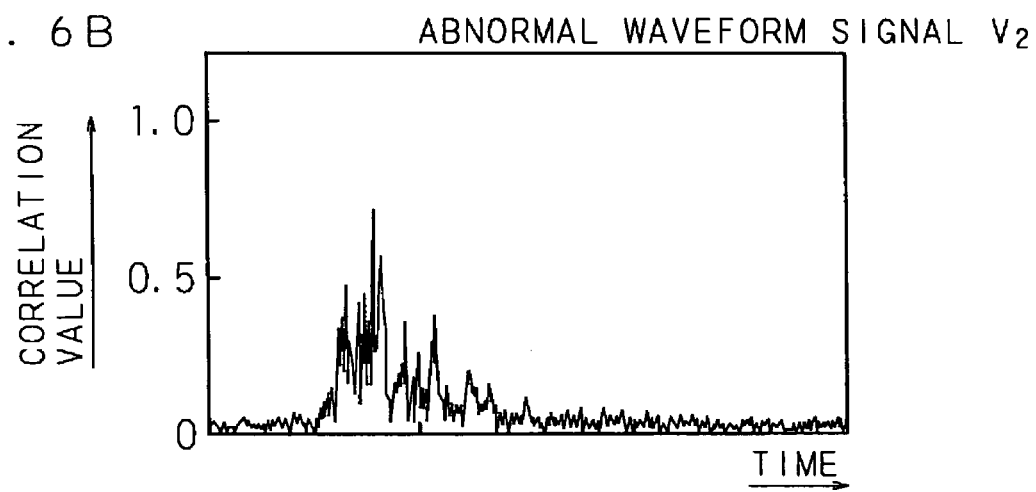
FIG. 6B  ABNORMAL WAVEFORM SIGNAL $V_2$
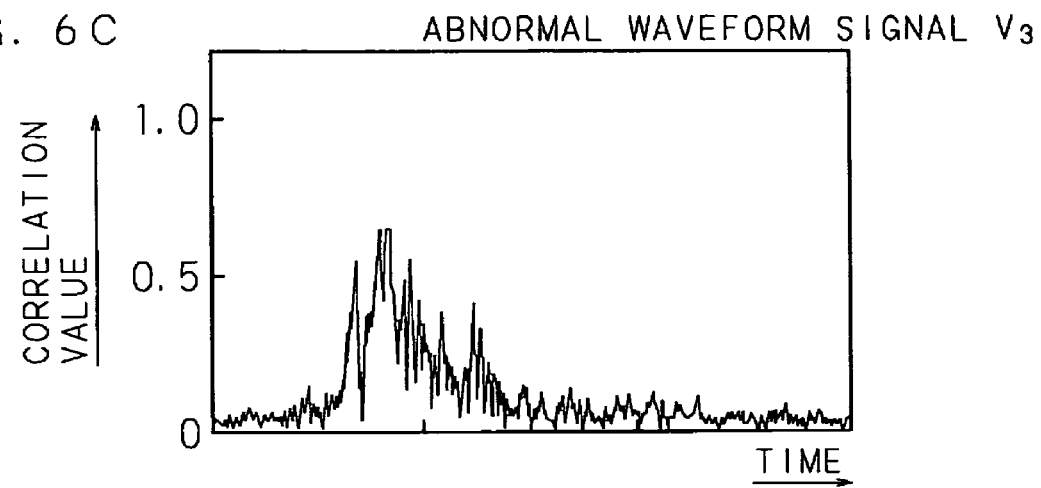
FIG. 6C  ABNORMAL WAVEFORM SIGNAL $V_3$

ABNORMALITY DIAGNOSING METHOD FOR SOUND OR VIBRATION AND ABNORMALITY DIAGNOSING APPARATUS FOR SOUND OR VIBRATION

CROSS-REFERENCE TO RELATED APPLICATIONS

This Nonprovisional application claims priority under 35 U.S.C. §119(a) on Patent Application No. 2006-25154 filed in Japan on Feb. 1, 2006, the entire contents of which are hereby incorporated by reference.

BACKGROUND OF THE INVENTION

The present invention relates to abnormality diagnosing method and apparatus for sound or vibration that allow the presence or absence of abnormality in a plurality of sound sources or vibration sources to be diagnosed on the basis of an analysis result of sound or vibration at a single evaluation point.

To find at an early stage various kinds of abnormality generated in a sound source or vibration source located in a space is an important issue in various fields of industry. For example, in an automobile having a large number of sound sources or vibration sources, when a failure occurring in each sound source or vibration source is found at a not-yet-serious stage, an appropriate countermeasure needs to be taken for the failure part, this avoids transition to a serious failure or occurrence of an accident caused by the serious failure. This provides usefulness in the improvement of safety.

When abnormality occurs in a sound source or vibration source, in general, sound or vibration varies in the generation part. Thus, when detecting means for sound or vibration is provided in each sound source or vibration source while the detection result of the detecting means is analyzed, abnormality can be found at an early stage. Nevertheless, in the case of an automobile described above, a large number of sound sources and vibration sources are present. Thus, it is not practical to provide detecting means individually in all these sources.

On the other hand, a large number of analysis methods for sound or vibration for identifying a sound source or vibration source have been proposed in the prior art. A widely adopted analysis method is a method based on the FFT (Fast Fourier Transform). In this method, a detection result of sound or vibration acquired as a waveform signal is processed by Fourier transformation, so that spectral intensity is obtained for each frequency component. Each of a detection signal of sound or vibration at an evaluation point set up in a target space and detection signals of sound or vibration at a plurality of candidate points expected to be a sound source or vibration source is processed by Fourier transformation. Then, the spectrum distribution at each candidate point is compared with the spectrum distribution at the evaluation point, so that a sound source or vibration source is identified.

Further, as for analysis methods for sound or vibration employing time information, an analysis method is based on the wavelet analysis. An abnormality diagnosing apparatus employing this method is proposed in the prior art (see, for example, Japanese Patent Publication No. 3561151). This abnormality diagnosing apparatus detects a waveform signal generated in a target object, then performs wavelet transformation, and thereby performs abnormality diagnosis of the target object on the basis of the result of the transformation. More specifically, this abnormality diagnosing apparatus is provided with analysis function determining means that automatically derives a mother wavelet appropriate for the abnormality diagnosis of the target object on the basis of the input waveform signal. Then, on the basis of the mother wavelet derived by the analysis function determining means, the abnormality diagnosing apparatus performs wavelet transformation on the waveform signal detected by a sensor, and then performs abnormality diagnosis of the target object on the basis of the transformation result. The analysis function determining means performs Fourier transformation on a plurality of waveform signals detected by the sensor, then performs inverse Fourier transformation on the average Fourier data obtained by averaging the Fourier transformation results, and thereby derives a mother wavelet.

BRIEF SUMMARY OF THE INVENTION

An analysis method employing FFT is applicable for finding abnormality in a sound source or vibration source. For example, data of noise acquired at the time of various kinds of abnormality may be prepared in advance. Then, Fourier transformation may be performed respectively on this data and a detection result of noise acquired in real time. According to this, abnormality in each section can be determined using the detection result of the noise acquired at a particular evaluation point.

Nevertheless, this analysis method is an analysis method not employing time information. Thus, when the noise signals generated at the time of abnormality in a plurality of sound sources or vibration sources are in the same or near frequency range, it is difficult to identify correctly the abnormality occurrence part. Thus, even when a countermeasure is taken at any one of the candidate points, a possibility arises that the countermeasure may be inappropriate. In contrast, when countermeasures are taken at all the candidate points, excessive and intrinsically unnecessary check and countermeasures are required at a plurality of the candidate points. This causes a problem.

The abnormality diagnosing apparatus described in Japanese Patent Publication No. 3561151 adopts wavelet analysis employing time information. Nevertheless, the mother wavelet derived by the analysis function determining means is shifted to a high frequency side or a low frequency side by the characteristic frequency in the scale. Thus, the wavelet coefficient calculated in the wavelet transformation using the enlarged or contracted mother wavelet hardly represents appropriate correspondence to abnormality in the target object. This causes a problem of poor precision in the abnormality diagnosis.

The present invention has been devised in view of this situation. An object of the present invention is to provide abnormality diagnosing method and apparatus in which an analysis method employing time information is adopted so that generation of abnormality in a plurality of sound sources or vibration sources can be diagnosed correctly on the basis of an analysis result of sound or vibration at a particular evaluation point.

The abnormality diagnosing method for sound or vibration according to the present invention is an abnormality diagnosing method for sound or vibration for analyzing sound or vibration that appears at an evaluation point set up in a target space containing a plurality of sound sources or vibration sources, and thereby diagnosing the presence or absence of abnormality occurring in the sound source or vibration source, characterized by comprising: a preliminary step of extracting abnormal waveform signals individually from a detection result of sound or vibration acquired in advance at the evaluation point at the time of occurrence of abnormality in each of the plurality of sound sources or vibration sources; a first step of extracting an evaluation waveform signal serving as an analysis target from a detection result of sound or vibration at the evaluation point; a second step of performing Hanning window processing, Fourier transformation, normalization processing, and Hilbert transformation on the evaluation waveform signal extracted at the first step, and thereby deriving a real signal mother wavelet of complex type; and a third step of performing wavelet transformation on each of the abnormal waveform signals extracted at the preliminary step by using the real signal mother wavelet derived at the second step, and thereby calculating a correlation value of each abnormal waveform signal with the real signal mother wavelet. Further, the method is characterized by further comprising a step of comparing the correlation value calculated at the third step with a predetermined criterion, and thereby determining the presence or absence of abnormality in each of the plurality of sound sources or vibration sources.

The abnormality diagnosing apparatus for sound or vibration according to the present invention is an abnormality diagnosing apparatus for sound or vibration for analyzing sound or vibration that appears at an evaluation point set up in a target space containing a plurality of sound sources or vibration sources, and thereby diagnosing the presence or absence of abnormality occurring in the sound source or vibration source, characterized by comprising: detecting means for sound or vibration arranged at the evaluation point; storage means for storing abnormal waveform signals individually extracted from a detection result of the detecting means at the time of occurrence of abnormality in each of the plurality of sound sources or vibration sources; extracting means for extracting an evaluation waveform signal serving as an analysis target from the detection result of the detecting means; deriving means for performing Hanning window processing, Fourier transformation, normalization processing, and Hilbert transformation on the evaluation waveform signal extracted by the extracting means, and thereby deriving a real signal mother wavelet of complex type; correlation calculating means for performing wavelet transformation on each of the abnormal waveform signals stored in the storage means by using the real signal mother wavelet derived by the deriving means, and thereby calculating a correlation value of each abnormal waveform signal with the real signal mother wavelet; determining means for comparing the calculation result of the correlation calculating means with a predetermined criterion, and thereby determining the presence or absence of abnormality in each of the plurality of sound sources or vibration sources; and display means for displaying one or both of the calculation result obtained by the correlation calculating means and the determination result obtained by the determining means.

In the abnormality diagnosing method and the abnormality diagnosing apparatus for sound or vibration according to the present invention, abnormal waveform signals (waveform signals to be evaluated) are stored that are extracted individually from detection results of sound or vibration acquired at an evaluation point at the time of occurrence of abnormality at a plurality of sound sources or vibration sources. On the other hand, a real signal mother wavelet of complex type is derived using an evaluation waveform signal (sample waveform signal) extracted from a detection result of sound or vibration acquired at the evaluation point in real time. Then, using this real signal mother wavelet, wavelet transformation is performed on the abnormal waveform signals, so that a correlation value containing time information is calculated between each abnormal waveform signal and the evaluation waveform signal. Then, using this correlation value, abnormality diagnosis for a plurality of sound sources or vibration sources can be implemented with precision on the basis of the detection result of sound or vibration at the evaluation point. Thus, on the basis of the result of this diagnosis, an appropriate countermeasure can be performed without excess or deficiency. This avoids transition to a serious abnormality and occurrence of an accident caused by this serious abnormality.

The above and further objects and features of the invention will more fully be apparent from the following detailed description with accompanying drawings.

BRIEF DESCRIPTION OF THE SEVERAL VIEWS OF THE DRAWINGS

FIG. 4A is a diagram showing an example of an evaluation waveform signal;

FIGS. 4B-4D are diagrams each showing an example of an abnormal waveform signal;

FIGS. 6A-6C are diagrams each showing a display example of a correlation value.

DETAILED DESCRIPTION OF THE INVENTION

Figure 1:
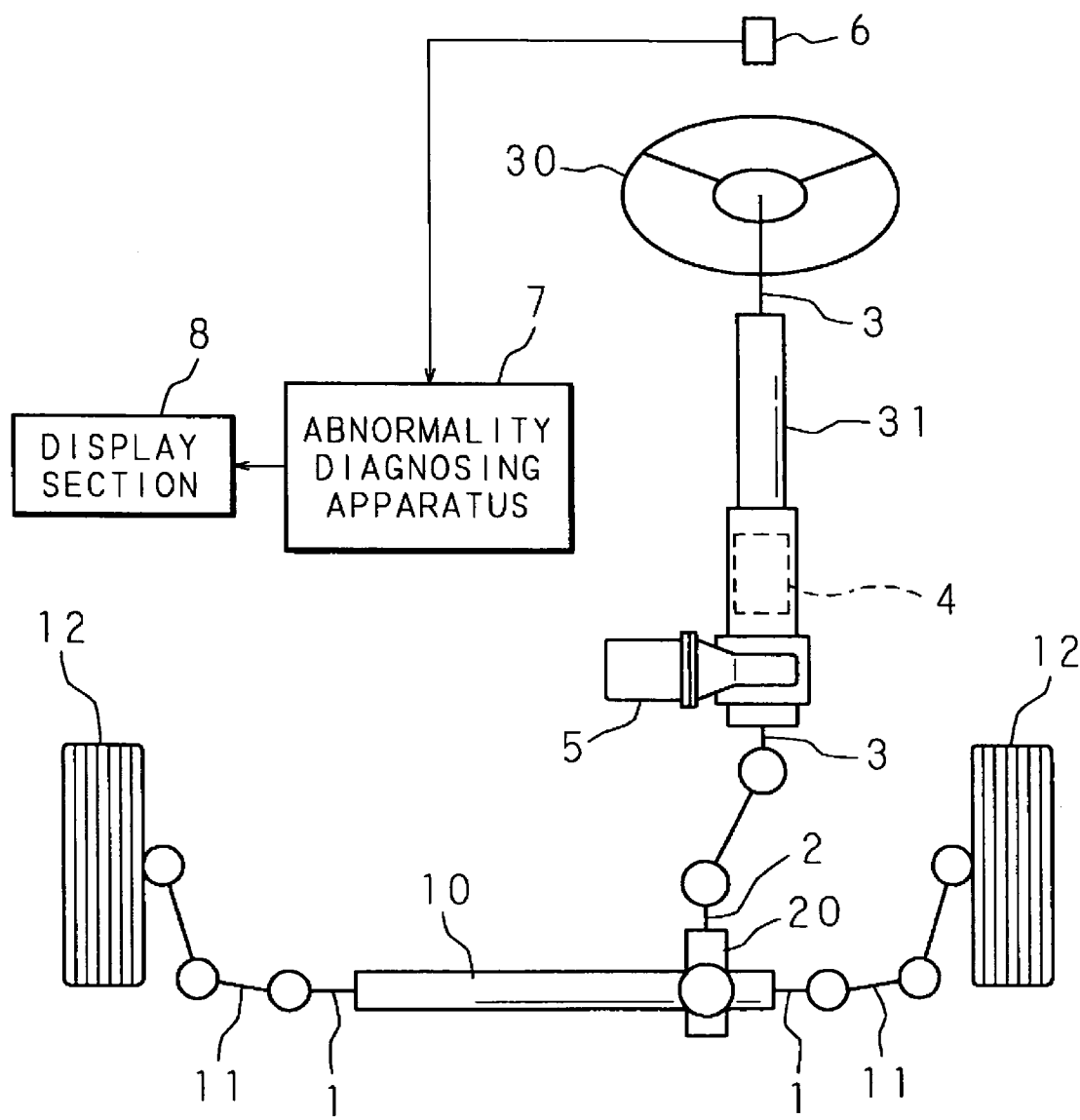
FIG. 1 is an explanatory view showing a state of implementation of an abnormality diagnosing method for sound or vibration according to the present invention.

The present invention is described below in detail with reference to the drawings showing an embodiment. FIG. 1 is an explanatory view showing a state of implementation of an abnormality diagnosing method for sound or vibration according to the present invention. In this figure, a state of implementation of an abnormality diagnosing method is illustrated, where a vibration source that causes abnormal noise generated inside a car cabin of an automobile is identified among the vibration sources located in individual sections of an electric power steering device provided in the automobile.

The configuration of the electric power steering device is described first. As shown in FIG. 1, the electric power steering device has a steering mechanism of rack and pinion type provided with a rack shaft 1 supported in a movable manner in the axial length direction in the inside of a rack housing 10 that extends in the right and left directions of a car body and with a pinion shaft 2 supported in a rotatable manner in the inside of a pinion housing 20 that intersects with the middle of the rack housing 10.

The two ends of the rack shaft 1 that protrude outward from both sides of the rack housing 10 are linked through tie rods 11 and 11 respectively to right and left front wheels 12 and 12 serving as steerable wheel. The upper end of the pinion shaft 2 that protrudes to the outside of the pinion housing 20 is linked through a steering shaft 3 to a steering wheel 30 serving as a steering member. Further, a pinion (not shown) is formed in the lower part of the pinion shaft 2 that extends inside the pinion housing 20. In a part intersecting with the rack housing 10, the pinion engages with the rack teeth formed over an appropriate length on the external surface of the rack shaft 1.

The steering shaft 3 is supported in a rotatable manner inside a column housing 31 having a cylinder shape, and then attached inside the car cabin via the column housing 31 in an inclined arrangement with the front side down. The steering wheel 30 is fixed to a protruding end of the steering shaft 3 toward the upper part of the column housing 31. A pinion shaft 2 is linked to a lower protruding end.

According to this configuration, when the steering wheel 30 is operated and rotated for steering, the rotation is transmitted to the pinion shaft 2 via the steering shaft 3. Then, the rotation of the pinion shaft 2 is converted into movement in the axial length direction of the rack shaft 1 in the engagement part between the pinion and the rack teeth. According to this movement of the rack shaft 1, the right and the left front wheels 12 and 12 are pushed and pulled respectively by the individual tie rods 11 and 11, so that steering is achieved.

In the middle of the column housing 31 that supports the steering shaft 3, a torque sensor 4 is provided for detecting a steering torque applied to the steering shaft 3 by the rotatory operation of the steering wheel 30. Further, a steering assistance motor 5 is attached at a position lower than the torque sensor 4.

The torque sensor 4 has a publicly known configuration in which the steering shaft 3 serving as the target for detection is divided into two up and down shafts while these two shafts are linked together on the same axis with a torsion bar having known torsion characteristics, and in which relative angular displacement generated by the operation of a steering torque between the two shafts that associates with a torsion in the torsion bar is detected by appropriate means. Further, the steering assistance motor 5 is attached outside the column housing 31 in a manner that its shaft axes intersect with each other approximately at rectangles. For example, in a transmission configuration, a worm fixed to the output end that extends inside the column housing 31 engages with the worm wheel fit and fixed to the outside of the steering shaft 3, so that the rotation of the motor 5 is transmitted to the steering shaft 3 with predetermined speed reduction via a transmission mechanism provided with a worm and a worm wheel.

The steering assistance motor 5 attached in this manner is driven in accordance with the direction and the magnitude of the steering torque detected by the torque sensor 4. At that time, the rotating force generated by the motor 5 is applied to the pinion shaft 2 linked to the lower end of the steering shaft 3, so that the rotating force assists the steering performed as described above.

In the electric power steering device having this configuration, when the above-mentioned steering is performed in accordance with a rotatory operation of the steering wheel 30, vibration occurs in the periphery of a part in which relative displacement is generated between the members, like in the periphery of the transmission mechanism that transmits the rotation of the steering assistance motor 5 to the steering shaft 3 with speed reduction, the periphery of the engagement part between the pinion shaft 2 and the rack shaft 1, and the periphery of the support part for supporting the rack shaft 1 in a slidable manner at one side-end part of the rack housing 10. This vibration propagates and is then heard in the car cabin.

The abnormality diagnosing method for sound or vibration according to the present invention addresses the sound generated in the car cabin as described above, and aims at diagnosing the presence or absence of abnormality in each of the above-mentioned vibration sources serving as a generation source of this sound. In this method, an evaluation point is defined at an appropriate position inside the car cabin, for example, in the periphery of the driver who operates the steering wheel 30. Then, a detector such as a microphone 6 for sound detection is arranged at this evaluation point. A sound detection signal of this microphone 6 is provided to the abnormality diagnosing apparatus 7. Then, the abnormality diagnosing apparatus 7 performs the following operation. Here, a vibration sensor may be used in place of the microphone 6.

Figure 2:
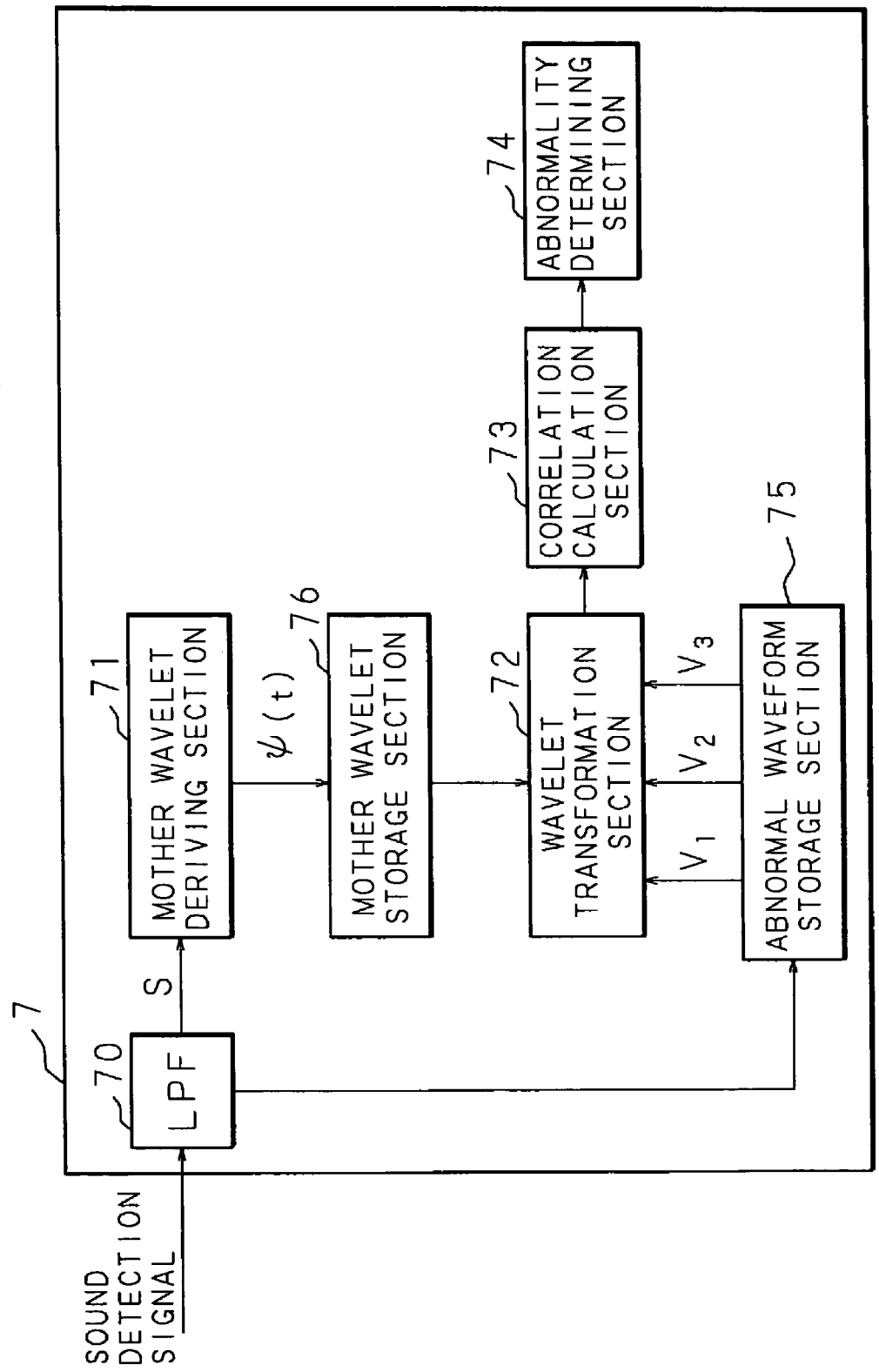
FIG. 2 is a block diagram showing an internal configuration of an abnormality diagnosing apparatus.

FIG. 2 is a block diagram showing an internal configuration of the abnormality diagnosing apparatus 7. The abnormality diagnosing apparatus 7 includes a low pass filter 70, a mother wavelet deriving section 71, a wavelet transformation section 72, a correlation calculation section 73, and an abnormality determining section 74. The abnormality diagnosing apparatus 7 further includes an abnormal waveform storage section 75 and a mother wavelet storage section 76. Furthermore, the abnormality diagnosing apparatus 7 is provided with a display section 8 for displaying the progress of diagnosis and the diagnosis result, as shown in FIG. 1.

A sound detection signal at the evaluation point acquired by the microphone 6 is filtered by the low pass filter 70, so that a waveform signal is extracted. This extracted signal (referred to as an evaluation waveform signal S in the following description) serves as a sample where high frequency noise is removed. The mother wavelet deriving section 71 derives a mother wavelet from the evaluation waveform signal S, and then provides the mother wavelet to the wavelet transformation section 72.

The abnormal waveform storage section 75 stores an abnormal waveform signal, that is, an evaluated waveform signal. This signal is extracted by filtering a sound detection signal acquired at the evaluation point (where the microphone 6 is arranged) when abnormality arises in each of the vibration sources described above and thereby removing high frequency noise. For simplicity, the following description is given under the assumption that the abnormal waveform storage section 75 stores three kinds of abnormal waveform signals $V_1$, $V_2$, and $V_3$ extracted individually from a sound detection signal under a condition that each of the three vibration sources in the electric power steering device shown in FIG. 1 is in an abnormal state. The three vibration sources are: the transmission mechanism from the steering assistance motor 5 to the steering shaft 3; the engagement part between the pinion shaft 2 and the rack shaft 1; and the support part of the rack shaft 1 on the one side of the rack housing 10. Here, when plural kinds of abnormal conditions exist in each of these three vibration sources, or alternatively when other vibration sources are to be included, a larger number of abnormal waveform signals are present. Thus, obviously, the following procedure is performed for all of these signals.

Figure 3:
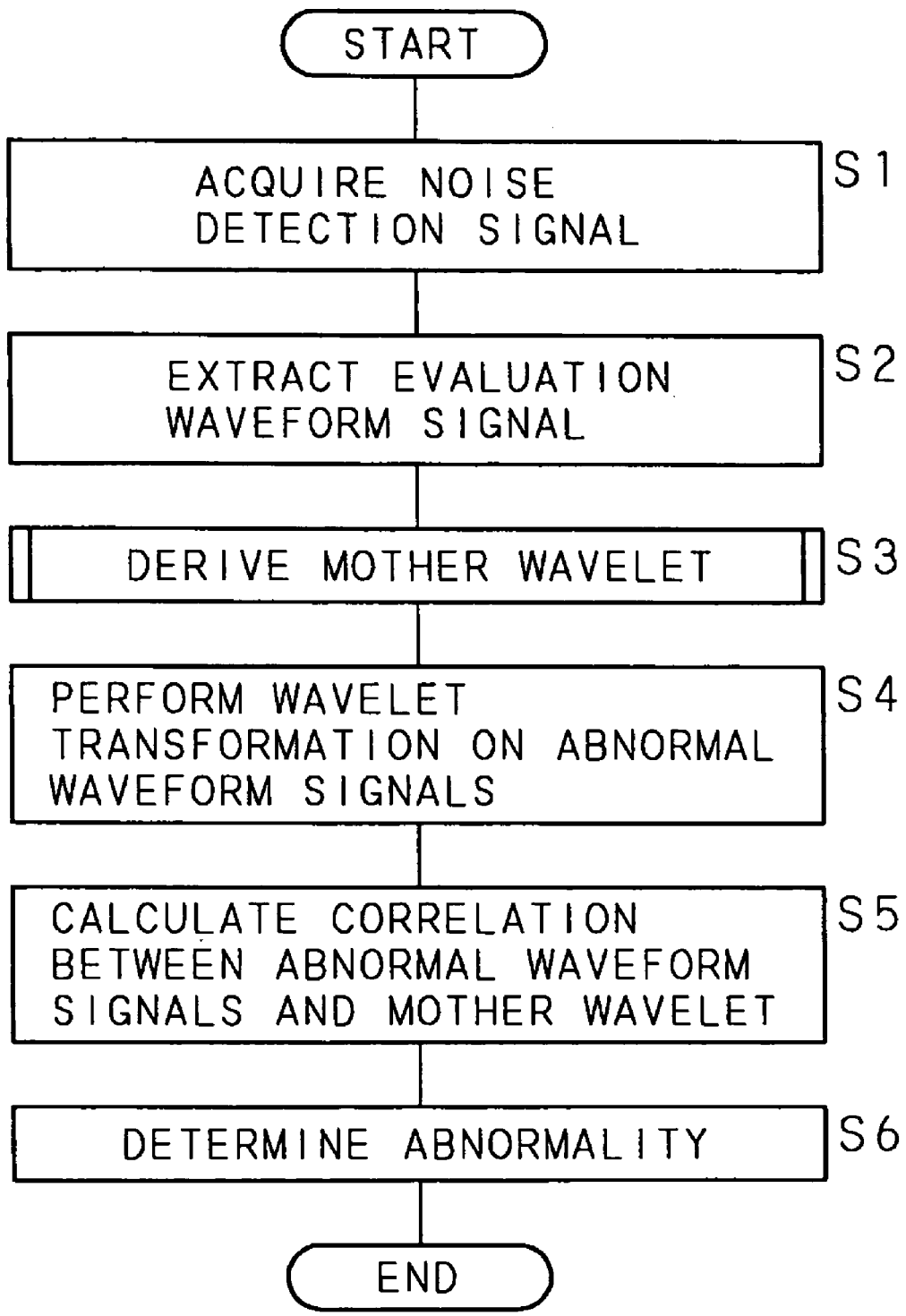
FIG. 3 is a flow chart showing a procedure of implementation of an abnormality diagnosing method according to the present invention performed in the abnormality diagnosing apparatus.

FIG. 3 is a flow chart showing a procedure of implementation of an abnormality diagnosing method according to the present invention performed in the abnormality diagnosing apparatus 7. The abnormality diagnosing apparatus 7 in FIG. 2 is illustrated as shown in the block diagram. However, the abnormality diagnosing apparatus 7 is actually constructed from an arithmetic processing unit composed of a CPU (Central Processing Unit), a ROM (Read Only Memory), a RAM (Random Access Memory), and the like. The following procedure shown as functional blocks executed in the mother wavelet deriving section 71, the wavelet transformation section 72, the correlation calculation section 73, and the abnormality determining section 74 are performed as the operation of the CPU in accordance with a program stored in the ROM. Alternatively, a computer program recorded on an appropriate recording medium may be loaded to a general purpose computer, so that the abnormality diagnosing apparatus 7 may be implemented.

The abnormality diagnosing apparatus 7 monitors a noise detection signal at the evaluation point acquired by the microphone 6. Then, when a detection signal serving as the target for detection is generated, the abnormality diagnosing apparatus 7 acquires the detection signal (Step 1). Then, the abnormality diagnosing apparatus 7 filters the detection signal, and thereby extracts an evaluation waveform signal S (Step 2).

FIGS. 4A-4D are diagrams showing examples of the evaluation waveform signal and the abnormal waveform signals. In these figures, the horizontal axis indicates the time, while the vertical axis indicates the amplitude. The evaluation waveform signal S shown in FIG. 4A and the three abnormal waveform signals $V_1$, $V_2$, and $V_3$ shown in FIGS. 4B, 4C, and 4D have the same time axis.

Then, the abnormality diagnosing apparatus 7 derives a real signal mother wavelet, more specifically, a real signal mother wavelet of complex type, from the evaluation waveform signal S extracted as described above (Step 3). The derivation of the real signal mother wavelet is performed using a waveform that is within a range satisfying a predetermined magnitude condition among the evaluation waveform signal S. In the selection of the use range, for example, the evaluation waveform signal S may be displayed on the display section 8 in a manner shown in FIG. 4A, and then the selection may be performed by an operator who recognizes visually this display. Alternatively, a predetermined magnitude condition may be stored in the RAM of the abnormality diagnosing apparatus 7 in advance, and then a use range satisfying this magnitude condition may be selected automatically.

A real signal mother wavelet $\psi(t)$ is a function given by the following Eq. (1). Quantity a in this Eq. (1) is a scale parameter corresponding to the inverse of the frequency, while b is a time parameter. In the following description, the adjunctive phrase "real signal" is omitted, so that the function is simply referred to as a mother wavelet $\psi(t)$.

[Equation 1]

$$\psi_{a,b}(t) = \frac{1}{\sqrt{a}} \psi\left(\frac{t-b}{a}\right) \quad (1)$$

The mother wavelet $\psi(t)$ need satisfy an admissible condition given by Eq. (2) in order that reconstruction of the signal should be possible. Here, $\hat{\psi}(\omega)$ hat denotes the Fourier transform of the mother wavelet $\psi(t)$.

[Equation 2]

$$C_\psi = \int_{-\infty}^{\infty} \frac{|\hat{\psi}(\varpi)|^2}{|\varpi|} d\varpi < \infty \quad (2)$$

$$\varpi = 2\pi f$$

Figure 5:
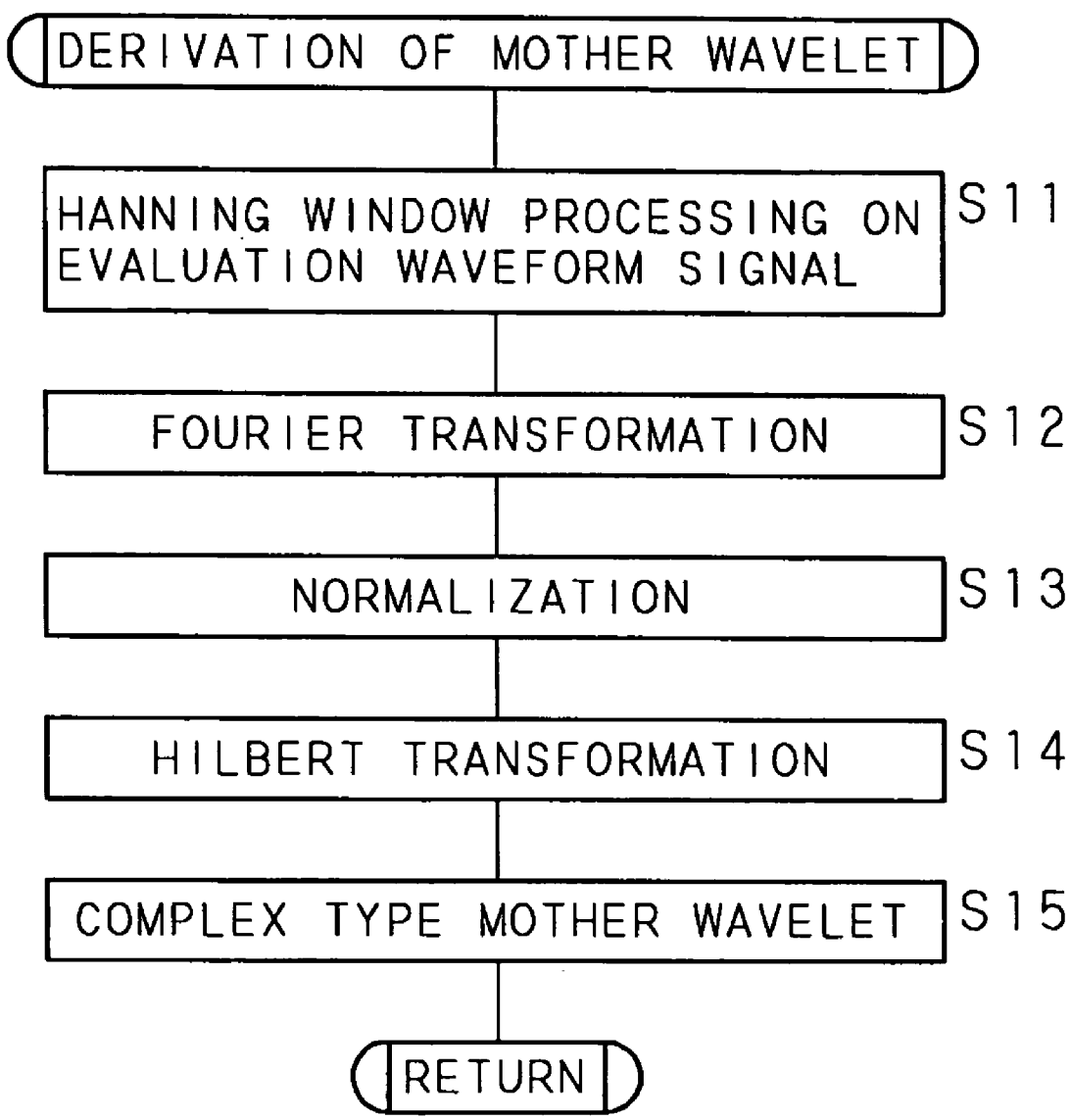
FIG. 5 is a flow chart showing a procedure of derivation of a mother wavelet.

FIG. 5 is a flow chart showing the procedure of derivation of the mother wavelet $\psi(t)$. In the abnormality diagnosing apparatus 7, the evaluation waveform signal S is provided, and then the use range is selected as described above. After that, Hanning window processing is performed on the waveform signal within the selected range in order that the condition of Eq. (2) should be satisfied (Step 11). Then, Fourier transformation is performed (Step 12). The mother wavelet $\psi(t)$ derived in this manner has a start point and an end point at zeros. Further, its average over the domain is zero, while the function is bounded.

Next, the abnormality diagnosing apparatus 7 performs normalization on the derived mother wavelet $\psi(t)$ in such a manner that the norm should be unity as given by Eq. (3) (Step 13). Further, in order that the feature should easily be recognized in the analysis of sound or vibration, it is preferable that a mother wavelet of complex type is used. Thus, the abnormality diagnosing apparatus 7 performs Hilbert transformation on the real type mother wavelet obtained by the normalization at Step 13 (Step 14), thereby constructs a complex type mother wavelet (Step 15), and then completes a series of derivation procedure of the mother wavelet $\psi(t)$.

[Equation 3]

$$\|\psi\| = \left[\int_{-\infty}^{\infty} \psi(t)^2 dt\right]^{\frac{1}{2}} = 1 \quad (3)$$

The complex type mother wavelet $\psi(t)$ is given by Eq. (4). The real type mother wavelet $\psi_R(t)$ is processed by Fourier transformation, so that the frequency spectrum $\psi_R(f)$ hat is obtained. The inverse Fourier transformation is performed in a state that $\psi_R(f)$ hat is replaced to zero in the negative frequency domain while $\psi_R(f)$ hat is replaced by $2\psi_R(f)$ hat in the positive frequency domain.

[Equation 4]

$$\psi(t) = \psi_R(t) + j\psi_I(t) \quad (4)$$

On completion of the above-mentioned procedure of deriving the mother wavelet $\psi(t)$, more specifically, the real function mother wavelet of complex type, the abnormality diagnosing apparatus 7 then performs wavelet transformation on the abnormal waveform signals $V_1$, $V_2$, and $V_3$ given as shown in FIGS. 4B, 4C, and 4D, by using the mother wavelet $\psi(t)$ (Step 4). Then, on the basis of this transformation result, the abnormality diagnosing apparatus 7 calculates correlation values between the abnormal waveform signals $V_1$, $V_2$, and $V_3$, and the mother wavelet $\psi(t)$ (Step 5).

In the wavelet transformation at Step 4, the wavelet transformation formula expressed by Eq. (5) is used, which contains the mother wavelet $\psi(t)$ derived from the evaluation waveform signal S at Step 3. Then, each of the abnormal waveform signals $V_1$, $V_2$, and $V_3$ is applied to the transform function f(t) in this equation, so that the transformation is performed. Here, $\psi^*(t)$ in Eq. (5) denotes the complex conjugate of the mother wavelet $\psi(t)$.

[Equation 5]

$$W(a, b) = \int_{-\infty}^{\infty} f(t)\psi_{a,b}^*(t) dt \quad (5)$$

The wavelet transformation performed as described above is the processing of obtaining the inner product between the transform function f(t) to which each of the abnormal waveform signals $V_1$, $V_2$, and $V_3$ is applied and the mother wavelet $\psi(t)$. When the transform function f(t) agrees with the mother wavelet $\psi(t)$, the inner product is unity, while when disagrees, the inner product is zero. In a state that the scale parameter a=1 in Eq. (1) is set up to be the center frequency, when the time parameter b is changed variously, correlation between the evaluation waveform signal S and each of the abnormal waveform signals $V_1$, $V_2$, and $V_3$ becomes clear on the time axis.

The mother wavelet $\psi(t)$ is normalized. Thus, when the abnormal waveform signals $V_1$, $V_2$, and $V_3$ applied to the transform function f(t) are larger than the mother wavelet $\psi(t)$, the correlation values become larger than unity in accordance with the ratio. Further, correlation can be obtained also for a frequency component of the mother wavelet $\psi(t)$. As such, for each of the three abnormal waveform signals $V_1$, $V_2$, and $V_3$ sequentially applied to the transform function f(t), instantaneous correlation can be obtained that indicates the degree of correlation including the component and the magnitude with respect to the evaluation waveform signal S used in the derivation of the mother wavelet $\psi(t)$.

The abnormal waveform signals $V_1$, $V_2$, and $V_3$ are stored in the abnormal waveform storage section 75, while the mother wavelet $\psi(t)$ is stored in the mother wavelet storage section 76. Thus, the calculation of the correlation values at Step 5 can be performed sequentially by using the values stored in these storage sections 75 and 76.

The mother wavelet $\psi(t)$ used in the present invention is a real signal mother wavelet of complex type derived on the basis of the detection result of the noise acquired actually at the evaluation point. Thus, the correlation value calculated at Step 5 for each of the plurality of abnormal waveform signals $V_1$, $V_2$, and $V_3$ processed by wavelet transformation at Step 4 expresses correctly the degree of correlation between the present noise at the evaluation point and the noise acquired at the time of occurrence of abnormality in each vibration source. Further, the result of the wavelet transformation contains time information, and hence the generation time can also be determined. Thus, even when the plurality of abnormal waveform signals $V_1$, $V_2$, and $V_3$ contain the same or near frequency component, the difference becomes clear in the degree of correlation of each signal with the evaluation waveform signal S.

On completion of the above-mentioned wavelet transformation at Step 4 and the calculation of the correlation value for each of the three abnormal waveform signals $V_1$, $V_2$, and $V_3$ at Step 5, the abnormality diagnosing apparatus 7 determines the presence or absence of abnormality by using the calculated correlation values (Step 6), and then completes a series of the analysis operation. Here, when the target noise or vibration is known in advance, or alternatively when the real signal mother wavelet has already been derived, Steps 1 and 3 may be skipped. In this case, analysis may be performed in a state that the real signal mother wavelet is stored in the memory in the CPU.

The abnormality determination at Step 6 is performed by comparing the result of wavelet transformation for each of the abnormal waveform signals $V_1$, $V_2$, and $V_3$ with a predetermined criterion. The result of this determination may be displayed on the display section 8 in an appropriate manner. FIGS. 6A-6C are diagrams showing display examples, where the correlation values calculated for the three abnormal waveform signals $V_1$, $V_2$, and $V_3$ are displayed in the form of graphs on the same time axis. The correlation value of the abnormal waveform signal $V_1$ shown in FIG. 6A is large. Thus, it is concluded that the noise detected at the evaluation point is caused by abnormality corresponding to the abnormal waveform signal $V_1$. The result of determination at Step 6 can be expressed as the display shown in FIGS. 6A-6C, and thereby reported to the operator. The criterion (threshold) used in the determination at Step 6 may be stored in the form of a database in the abnormality diagnosing apparatus 7. This permits more accurate determination.

Thus, in a case that display as shown in FIGS. 6A-6C is obtained, when an appropriate countermeasure such as check and repair of the correspondence part is taken for the abnormality corresponding to the abnormal waveform signal $V_1$, this avoids transition a serious failure and occurrence of an accident caused by the serious failure.

The above-mentioned embodiment has been described for an example of analysis in which the presence or absence of abnormality in vibration sources located in individual sections of an electric power steering device is determined on the basis of a sound detection result inside a car cabin. However, the abnormality diagnosing method and the abnormality diagnosing apparatus according to the present invention are applicable to general usage in which the presence or absence of abnormality in sound sources or vibration sources located in the periphery of a target space is determined on the basis of a detection result of sound or vibration at an appropriate evaluation point in the target space. Thus, obviously, the present invention can be used widely in various fields of industry.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An abnormality diagnosing method for sound or vibration for analyzing sound or vibration that appears at an evaluation point set up in a target space containing a plurality of sound sources or vibration sources, and thereby diagnosing the presence or absence of abnormality occurring in the sound source or vibration source, comprising:

a preliminary step of extracting abnormal waveform signals individually from a detection result of sound or vibration acquired in advance at the evaluation point at the time of occurrence of abnormality in each of the plurality of sound sources or vibration sources;

a first step of extracting an evaluation waveform signal serving as an analysis target from a detection result of sound or vibration at the evaluation point;

a second step of performing Hanning window processing, Fourier transformation, normalization processing, and Hilbert transformation on the evaluation waveform signal extracted at said first step, and thereby deriving a real signal mother wavelet of complex type;

a third step of performing wavelet transformation on each of the abnormal waveform signals extracted at said preliminary step by using the real signal mother wavelet derived at said second step, and thereby calculating a correlation value of each abnormal waveform signal with the real signal mother wavelet;

a fourth step of comparing the correlation value calculated at said third step with a predetermined criterion, and thereby determining the presence or absence of abnormality in each of the plurality of sound sources or vibration sources; and a fifth step of displaying the correlation values calculated by the third step on a same time axis on a display section, wherein the real signal mother wavelet derived at the second step has a start point and an end point at zeros, and an average over the domain of the real signal mother wavelet is zero while the function is bounded, and wherein the third step of performing the wavelet transformation includes obtaining an inner product between a transform function to which each of the abnormal waveform signals is applied and the real signal mother wavelet.

2. An abnormality diagnosing apparatus for sound or vibration for analyzing sound or vibration that appears at an evaluation point set up in a target space containing a plurality of sound sources or vibration sources, and thereby diagnosing the presence or absence of abnormality occurring in the sound source or vibration source, comprising:
- a detecting section for sound or vibration arranged at the evaluation point;
- a storage section for storing abnormal waveform signals individually extracted from a detection result of said detecting section at the time of occurrence of abnormality in each of the plurality of sound sources or vibration sources;
- an extracting section for extracting an evaluation waveform signal serving as an analysis target from the detection result of said detecting section;
- a deriving section for performing Hanning window processing, Fourier transformation, normalization processing, and Hilbert transformation on the evaluation waveform signal extracted by said extracting section, and thereby deriving a real signal mother wavelet of complex type;
- a correlation calculating section for performing wavelet transformation on each of the abnormal waveform signals stored in said storage section by using the real signal mother wavelet derived by said deriving section, and thereby calculating a correlation value of each abnormal waveform signal with the real signal mother wavelet;
- a determining section for comparing the calculation result of said correlation calculating section with a predetermined criterion, and thereby determining the presence or absence of abnormality in each of the plurality of sound sources or vibration sources; and
- a display section for displaying one or both of the calculation result obtained by said correlation calculating section and the determination result obtained by said determining section,
- wherein said display section displays on a same time axis the correlation values calculated by said correlation calculating section,
- wherein the real signal mother wavelet derived by the deriving section has a start point and an end point at zeros, and an average over the domain of the real signal mother wavelet is zero while the function is bounded, and
- wherein the correlation calculating section performs the wavelet transformation by obtaining an inner product between a transform function to which each of the abnormal waveform signals is applied and the real signal mother wavelet.

3. An abnormality diagnosing apparatus for sound or vibration for analyzing sound or vibration that appears at an evaluation point set up in a target space containing a plurality of sound sources or vibration sources, and thereby diagnosing the presence or absence of abnormality occurring in the sound source or vibration source, comprising:
- a first storage section for storing abnormal waveform signals extracted individually from a detection result of a detecting section for sound or vibration arranged at the evaluation point at the time of occurrence of abnormality in each of the plurality of sound sources or vibration sources;
- a second storage section for storing a real signal mother wavelet of complex type derived by Hanning window processing, Fourier transformation, normalization processing, and Hilbert transformation performed on the evaluation waveform signal extracted from the detection result of said detecting section;
- a correlation calculating section for performing wavelet transformation on each of the abnormal waveform signals stored in said first storage section by using the real signal mother wavelet stored in said second storage section, and thereby calculating a correlation value of each abnormal waveform signal with the real signal mother wavelet;
- a determining section for comparing the calculation result of said correlation calculating section with a predetermined criterion, and thereby determining the presence or absence of abnormality in each of the plurality of sound sources or vibration sources; and
- a display section for displaying one or both of the calculation result obtained by said correlation calculating section and the determination result obtained by said determining section,
- wherein said display section displays on a same time axis the correlation values calculated by said correlation calculating section
- wherein the real signal mother wavelet has a start point and an end point at zeros, and an average over the domain of the real signal mother wavelet is zero while the function is bounded, and
- wherein the correlation calculating section performs the wavelet transformation obtaining an inner product between a transform function to which each of the abnormal waveform signals is applied and the real signal mother wavelet.

* * * * *